US010076974B2

(12) United States Patent
Hill et al.

(10) Patent No.: US 10,076,974 B2
(45) Date of Patent: Sep. 18, 2018

(54) MODULAR FORWARD AND REARWARD SEAT POSITION ADJUSTMENT SYSTEM, WITH INTEGRAL VIBRATION ISOLATION SYSTEM

(71) Applicant: Milsco Manufacturing Company, A Unit of Jason Incorporated, Milwaukee, WI (US)

(72) Inventors: Kevin Hill, Mequon, WI (US); Bruce Dahlbacka, Port Washington, WI (US)

(73) Assignee: Milsco Manufacturing Company, A Unit of Jason Incorporated, Milwaukee, WI (US)

( * ) Notice: Subject to any disclaimer, the term of this patent is extended or adjusted under 35 U.S.C. 154(b) by 23 days.

(21) Appl. No.: 15/175,005

(22) Filed: Jun. 6, 2016

(65) Prior Publication Data

US 2016/0355105 A1     Dec. 8, 2016

Related U.S. Application Data

(60) Provisional application No. 62/171,229, filed on Jun. 4, 2015.

(51) Int. Cl.
*F16M 1/00* (2006.01)
*B60N 2/07* (2006.01)
(Continued)

(52) U.S. Cl.
CPC ............... *B60N 2/07* (2013.01); *B60N 2/067* (2013.01); *B60N 2/0837* (2013.01); *B60N 2/502* (2013.01); *B60N 2/522* (2013.01); *B60N 2/54* (2013.01)

(58) Field of Classification Search
USPC .......................................................... 248/565
See application file for complete search history.

(56) References Cited

U.S. PATENT DOCUMENTS 4,238,099 A    12/1980  Hunwicks
4,384,701 A     5/1983  Barley
(Continued)

FOREIGN PATENT DOCUMENTS

SU           494295        12/1975

OTHER PUBLICATIONS

International Search Report dated Oct. 27, 2016 in corresponding PCT/US2016/036108.

*Primary Examiner* — Monica E Millner
(74) *Attorney, Agent, or Firm* — Boyle Fredrickson S.C.

(57) ABSTRACT

A seat position adjuster with a manipulable control shaft carrying a position locking latch and a spring that biases the latch toward a latched position that locks seat position with the spring being part of a vibration isolator selectively deactivated by an isolator lockout. The shaft is rotatively and axially movable relative to a mounting bracket carrying the shaft that also is attached to one rail of a slide mechanism with the latch being urged by spring into operative engagement with the other rail. Spring is captured in torsion rotatively biasing the latch toward the latched position and is active in tension and/or compression isolating the seat from vibration and lateral/longitudinal accelerations. A control shaft of the lockout is manipulable between a locked position deactivating isolation by preventing axial movement of the position adjuster control shaft relative to bracket and an unlocked position permitting relative axial movement therebetween activating isolation.

19 Claims, 4 Drawing Sheets

(51) Int. Cl.
  *B60N 2/06* (2006.01)
  *B60N 2/08* (2006.01)
  *B60N 2/50* (2006.01)
  *B60N 2/54* (2006.01)
  *B60N 2/52* (2006.01)

(56) References Cited

U.S. PATENT DOCUMENTS

| | | | |
|---|---|---|---|
| 4,455,009 A | 6/1984 | Foster et al. | |
| 4,712,759 A | 12/1987 | Sugama et al. | |
| 4,742,983 A | 5/1988 | Nihei | |
| 4,779,832 A | 10/1988 | Rees | |
| 4,817,904 A | 4/1989 | Munakata et al. | |
| 4,909,469 A | 3/1990 | Nihei et al. | |
| 4,930,736 A | 6/1990 | Fourrey et al. | |
| 5,052,751 A | 10/1991 | Hayakawa et al. | |
| 5,082,228 A | 1/1992 | Shimazaki | |
| 5,167,393 A | 12/1992 | Hayakawa et al. | |
| 5,273,241 A | 12/1993 | Droulon | |
| 5,286,076 A | 2/1994 | DeVoss et al. | |
| 5,358,207 A | 10/1994 | West | |
| 5,556,165 A | 9/1996 | Pickles | |
| 5,577,790 A | 11/1996 | Buell | |
| 5,727,768 A | 3/1998 | Sakamoto | |
| 5,816,555 A * | 10/1998 | Ito | B60N 2/067 248/424 |
| 5,871,198 A | 2/1999 | Bostrom et al. | |
| 5,971,342 A | 10/1999 | Sakai et al. | |
| 6,035,980 A | 3/2000 | Fujita et al. | |
| 6,405,988 B1 | 6/2002 | Taylor et al. | |
| 6,464,194 B1 | 10/2002 | Armo | |
| 6,648,394 B2 | 11/2003 | Lejeune et al. | |
| 6,767,063 B1 * | 7/2004 | Abdella | B60N 2/085 297/344.11 |
| 6,773,049 B2 | 8/2004 | Rupiper et al. | |
| 6,986,550 B2 | 1/2006 | Gevaert et al. | |
| 8,469,328 B2 | 6/2013 | Nakamura et al. | |
| 8,490,940 B2 | 7/2013 | Ito et al. | |
| 8,573,698 B2 | 11/2013 | Wojatzki et al. | |
| 8,632,043 B2 | 1/2014 | Dahlbacka et al. | |
| 8,800,949 B2 * | 8/2014 | Schebaum | B60N 2/0705 248/429 |
| 8,899,559 B2 * | 12/2014 | Whitaker | F16F 7/08 267/48 |
| 2004/0222348 A1 | 11/2004 | Yokota | |
| 2005/0006937 A1 | 1/2005 | Takata et al. | |
| 2006/0289717 A1 | 12/2006 | Ito | |
| 2011/0031774 A1 * | 2/2011 | Koga | B60N 2/067 296/65.15 |
| 2013/0186217 A1 * | 7/2013 | Enokijima | B60N 2/067 74/89.33 |
| 2013/0206950 A1 | 8/2013 | Hayashi | |
| 2015/0035334 A1 | 2/2015 | Roth et al. | |
| 2015/0090855 A1 | 4/2015 | Arakawa et al. | |
| 2016/0107545 A1 | 4/2016 | Pluta et al. | |

* cited by examiner

MODULAR FORWARD AND REARWARD SEAT POSITION ADJUSTMENT SYSTEM, WITH INTEGRAL VIBRATION ISOLATION SYSTEM

CROSS REFERENCE

Pursuant to 35 U.S.C. § 119(e), this application claims all benefits to and priority in U.S. Provisional Application Ser. No. 62/171,229, filed on Jun. 4, 2015, the entirety of which is hereby expressly incorporated by reference herein.

FIELD

The present invention is directed to a seat position adjustment system and more particularly to a seat position adjustment system that also provides vibration isolation that is particularly well suited for use with seat assemblies requiring a more compact lower profile seat position adjuster.

BACKGROUND

In the past, attempts have been made to provide longitudinal or lateral isolation of a vehicle seat of a vehicle seat assembly using relatively large steel frames that span a suspension of sub-structure, e.g., seat slide mechanisms or seat frame, of the seat making them impractical for use in more compact vehicle seat assemblies and seat assemblies requiring lower profile seat position adjustment systems. Where in use, they typically employ a first frame fixed to ground, e.g., the vehicle frame, or to the upper housing of a seat suspension fixed to ground, and a second frame fixed to the seat in a manner that enables the second frame to move relative to the first frame. Multiple rollers or slide blocks and channels are used to provide guided motion of the second frame with respect the first frame, with opposing extension or compression springs along with a damper used to isolate the seat occupant from longitudinal or lateral accelerations. There are also systems that incorporate alternate embodiments such as elastomers and swinging links. To provide fore-aft seat position adjustment, a pair of fore-aft seat position adjustment slides or slide mechanisms are provided that use a completely separate seat position adjustment system or adjuster to adjust the fore-aft seat occupant position. Unfortunately, since all of these systems require relatively large frames that span the seat suspension or sub-structure, they are unsuitable for use with more compact seat assemblies and lower profile seat assemblies. While U.S. Pat. No. 4,455,009 is directed to a forward and rearward seat position adjustment system that also attempt to provide some isolation, the system uses multiple opposing springs and a seat position adjustment lever that requires a considerable amount of space to permit up and down movement of the lever needed to perform seat position adjustment.

What is needed is a forward and rearward seat position adjustment system that provides vibration isolation and which overcomes one or more of the aforementioned drawbacks.

SUMMARY

The present invention is directed to a vibration isolating vehicle seat position adjustment system that preferably is of modular construction which includes a fore-aft seat position adjuster equipped with an integral vibration isolator that provides isolation from vibration and other lateral and/or longitudinal accelerations encountered during vehicle operation. Where it is desired to de-activate or lockout the isolator to prevent vibration isolation from being provided, a vibration isolating vehicle seat position adjustment system constructed in accordance with the present invention can be and preferably also is equipped with an isolator lockout configured to (a) lock the isolator thereby de-activating the isolator when vibration isolation is not desired, and (b) unlock the isolator when vibration isolation is desired.

A vibration isolating vehicle seat position adjustment system constructed in accordance with the present invention also includes a housing with a mounting bracket to which the seat position adjuster, isolator, and isolator lockout are mounted forming a vibration isolating vehicle seat position adjustment module that can be pre-assembled as a module and the module attached by the mounting bracket to a vehicle seat assembly during manufacture of the vehicle seat assembly. Where equipped with an isolator lockout, the lockout is pre-assembled as part of such a module. Such a module preferably includes a protective shroud enclosing the position adjuster, isolator, and isolator lockout, and is attached alongside one of a pair of generally parallel fore-aft extending seat slide mechanisms that provide fore-aft seat movement to the completed vehicle seat assembly.

The fore-aft seat position adjuster includes an elongate fore-aft extending control shaft carried by the housing preferably by being mounted by mounts, preferably in the form of outwardly, e.g., downwardly, extending mounting tabs of a mounting bracket of the housing in a manner that permits the control shaft to axially move and rotate relative to the bracket and housing. The control shaft carries a seat position locking latch that is displaced, preferably by control shaft rotation, between (a) a latched position locking at least one seat slide mechanism in place thereby preventing fore-aft seat movement, and (b) an unlatched position unlocking the seat slide mechanism thereby permitting fore-aft seat movement.

Each seat slide mechanism includes a pair of movably, e.g., slidably, interlocked seat slide rails translatable or movable relative to one another with one of the rails, e.g., upper rail, carrying the seat and another one of the rails, e.g., lower rail, either grounded to a frame or chassis of the vehicle, or fixed to a seat suspension attached to the vehicle frame or chassis. The seat position adjuster is configured so that the seat position locking latch substantially immovably fixes the upper and lower rails of at least one of the seat slide mechanisms to one another to prevent fore-aft seat movement thereby releasably locking fore-aft seat position when latched. The upper and lower rails of the seat slide mechanism are substantially immovably fixed to one another when the latch is latched because the isolator allows vibration and acceleration isolation accommodating play therebetween when the isolator is operation and not deactivated by the isolator lockout. When the isolator is deactivated by the isolator lockout, the upper and lower rails of the seat slide mechanism preferably are immovably grounded to each other when the latch of the seat position adjuster is disposed in the latched position.

In a preferred embodiment, the mounting bracket of the housing of the module is fixed to one of the rails, e.g., upper rail, of the slide mechanism and the seat position locking latch operatively engages the other one of the rails, e.g., lower rail, of the slide mechanism when disposed in the latched position thereby substantially immovably fixing the rails together substantially preventing relative translation therebetween releasably securing the seat in a desired fore-aft position. While the rail, e.g., lower rail, operably engaged by the seat position locking latch can be configured to directly engage the latch, a latch engaging rack, such as in the form of a rack bracket, is attached to the rail, e.g., lower rail, and configured to enable the latch to engage the rack when disposed in the latched position to fix seat position. In a preferred embodiment, the rack is a toothed rack equipped with at least a plurality of pairs, i.e., at least three, fore-aft spaced apart teeth and the latch has at least one and preferably at least a plurality of rack teeth receivers, such as each in the form of a teeth receiving aperture, that receive a corresponding one of the rack teeth when the latch is disposed in the latched position in engagement with the rack teeth.

The seat position locking latch extends outwardly from a latch cylinder fixed to the seat position adjuster control shaft such that the latch and latch cylinder rotate and axially move substantially in unison with the control shaft. The control shaft has a manipulable control preferably in the form of a grip or handle that is manipulable by a seat occupant while sitting in the seat to turn the control shaft and latch cylinder either in one direction towards the latched position until the latch is disposed in the latched position fixing seat position or in an opposite direction away from the latched position to disengage the latch to permit fore-aft seat movement and seat position adjustment.

The seat position locking latch is biased towards the latched position by a biasing element that preferably rotatively biases the latch cylinder toward the latched position thereby urging the latch towards the latched position. In a preferred embodiment, the biasing element is a torsional biasing element carried by the control shaft that applies a torque that rotatively biases the latch cylinder toward the latched position thereby biasing the latch towards the latched position.

The vibration isolator is integrally formed of part of the seat position adjuster by the torsionally biasing element also being axially stretchable and/or compressible defining a vibration isolating biasing element in tension and/or compression that provides vibration isolation including by isolating vibration, absorbing vibration, dampening vibration, and otherwise minimizing and/or preventing transmission of these and other lateral and/or longitudinal accelerations encountered during vehicle operation to the seat occupant. Such a torsional and vibration isolating biasing element forms part of both the seat position adjuster and the isolator by torsionally biasing the latch cylinder and latch toward the latched position while substantially simultaneously being able to act axially in tension and/or compression as a stretchable and/or compressible isolating biasing element that isolates the seat position adjuster from the housing to which it is mounted. By doing so, isolation of the seat occupant from such vibration and other lateral and/or longitudinal accelerations is provided thereby when the position adjuster is latched and the isolator activated.

By isolating the seat position adjuster from the housing, the vibration isolating latch biasing element preferably also isolates one of the seat slide rails from the other one of the seat slide rails of the seat slide mechanism thereby helping to isolate the vehicle seat from the vehicle frame or chassis reducing vibration transmission to a seat occupant sitting in the vehicle seat. Seat occupant comfort, if not also isolation, is enhanced by the ability of the biasing element when functioning as part of the isolator to permit a limited amount of axial movement of the seat position adjuster control shaft relative to the housing in response to larger impact loads, such as in the form of bigger bumps, jolts and shocks, encountered during vehicle operation while the latch of the seat position adjuster is disposed in the latched position.

In a preferred embodiment, the vibration isolating latch biasing element is a spring preferably captured in torsion between a spring seat of the latch cylinder and a spring seat grounded to the housing that can be and preferably is part of a bearing fixed to one of the mounts of the mounting bracket of the housing that axially and/or rotatively supports the seat position adjuster control shaft during seat position adjuster use and operation. In one such preferred embodiment, the spring is a coil spring, preferably a helically wound coil spring, which is captured both (a) in torsion between the latch cylinder and bearing and/or mount of the housing, and (b) in tension and/or compression therebetween thereby defining a vibration isolating latch biasing spring that is (a) a torsion spring of the seat position adjuster that rotatively urges the latch toward the latched position, and (b) a vibration isolating spring of the isolator that acts in tension and/or compression when vibration and other lateral and/or longitudinal accelerations are encountered to help isolate them from the seat occupant. When the position adjuster is latched and the isolator activated, the vibration isolating latch biasing spring substantially simultaneously is both (a) a torsion spring of the seat position adjuster that rotatively urges the latch toward the latched position, and (b) a vibration isolating spring of the isolator that acts in tension and/or compression when vibration and other lateral and/or longitudinal accelerations are encountered to help isolate them from the seat occupant.

In a preferred embodiment, at least the spring seat of the latch cylinder is a torsion spring seat with one end of the spring coaxially telescoped over a generally cylindrical portion of one end of the latch cylinder that defines the torsion spring seat of the latch cylinder and the other end of the spring coaxially telescoped over a generally cylindrical portion of the bearing extending outwardly from mount of housing that defines a spring seat of the bearing that can be and preferably also is a torsion spring seat. The torsion spring seat of at least the latch cylinder preferably includes a spring wire receiving groove that preferably is helical and receives a helically would wire of the spring when seated thereon. The torsion spring seat of at least the latch cylinder preferably further includes a spring stop in the form of an upraised abutment against which a free end of the spring wire abuts or engages. If desired, the spring seat of the bearing can be and preferably also is a torsion spring seat of substantially the same construction as the torsion spring seat of the latch cylinder.

The isolator preferably includes at least one and preferably a pair of fore-aft isolator travel-limiting bumpers that are each carried by the seat position adjuster control shaft that respectively limit isolator over travel in opposite directions by limiting the forward and rearward extent that the position adjuster control shaft can move relative to the housing. One of the bumpers is axially and rotatively fixed to the seat position adjuster control shaft in a forward over-travel limiting position where the forward bumper abuts against a forwardly disposed mount of the bracket of the housing when impact loads caused by larger shocks, bumps and jolts cause the control shaft to move too far forwardly relative to the housing. The other one of the bumpers is axially and rotatively fixed to the seat position adjuster control shaft in an aft over-travel limiting position where the aft bumper abuts against a rearwardly disposed mount of the bracket of the housing when impact loads caused by larger shocks, bumps and jolts cause the control shaft to move too far rearwardly relative to the housing.

The isolator can and preferably does also include a damper attached to the housing with a reciprocable piston rod of the damper operably coupled to the seat position adjuster control shaft enabling force from such vibration and lateral and/or longitudinal accelerations to be transmitted by the control shaft to the damper to help further isolate them by dampening them preventing or further reducing their transmission to the seat occupant. In a preferred embodiment, the isolator is a spring-mass-damper isolator arrangement formed of the mass of the seat occupant sitting in the vehicle seat, the vibration isolating latch biasing spring coaxially carried by the seat position adjuster control shaft and captured between the latch cylinder and aft spring seat anchor control shaft bearing, and the damper that has one end grounded to the housing and the piston rod extending outwardly from its opposite end that is coaxial with and coupled to an aft end of the control shaft for axial reciprocable movement in unison therewith.

Where equipped with an isolator lockout, the isolator lockout is configured to lockout vibration isolation by deactivating the isolator by axially grounding the seat position adjuster control shaft to the housing in a manner that allows relative rotation therebetween but which prevents relative axial movement therebetween. In a preferred embodiment, the isolator lockout is an "on-off" control that includes a lockout latch operatively connected by an isolator lockout control shaft to a manipulable control, such as in the form of a grip or handle, which is manipulable by a seat occupant between (a) a locked position where the lockout latch is disposed in operable cooperation with the seat position adjuster control shaft thereby preventing axial movement of the seat position adjuster control shaft relative to the housing deactivating the vibration isolator, and (b) an unlocked position where the lockout latch is no longer in operable cooperation with the seat position adjuster control shaft thereby activating the vibration isolator causing vibration isolation to be provided.

In a preferred embodiment, the seat position adjuster control shaft has an isolator lockout lock collar axially fixed thereto that is engaged by the lockout latch when disposed in the locked position axially fixing the position adjuster control shaft in place in a manner that prevents axial movement relative to the housing but which can permit control shaft rotation relative to the housing. A preferred lockout latch has a lock collar receptacle in the form of a slot or channel that receives the lock collar of the position adjuster control shaft when disposed in the locked position interfering with fore-aft axial movement of the position adjuster control shaft relative to the housing thereby locking out vibration isolation.

When the isolator lockout latch is unlocked, the isolator is operational permitting the hip joint, shoulder joint, and other body parts of the seat occupant to translate at least slightly in a fore-aft direction with the isolator preferably also providing isolation that reduces the magnitude of vibration and other lateral/longitudinal accelerations reaching the seat occupant improving seat occupant comfort. The inclusion of such an isolator lockout enable a seat occupant to lock and thereby deactivate the isolator depending on the task being performed, seat occupant, e.g., operator, preference, and the like when vibration isolation is not needed or not desired.

A modular forward and rearward seat position adjustment system constructed in accordance with the present invention has fore-aft seat position adjuster with an integral seat vibration isolation system or vibration isolator, which utilizes a single spring that provides both longitudinal acceleration isolation and fore/aft seat position adjustment latch biasing force. A damper, preferably hydraulic, can be mounted co-axial to the single spring to further improve isolation. The system is coupled to a mechanical seat slide mechanism typically used to provide only fore-aft position seat position adjustment but which also advantageously defines an isolator guide that guides or constrains isolator movement or travel in a linear fore-aft direction parallel to fore-aft seat slide mechanism movement.

Such a forward and rearward seat position adjustment system with integral seat vibration isolation is advantageously compact as it is packaged within the length of the slide rails of the seat slide mechanism. The system advantageously adds minimal height to the vertical dimension of the fore-aft seat position adjuster. The compact design of the assembly allows the system to be added to any seat assembly that uses fore-aft translating slide mechanisms. The seat position adjuster of the present invention permits some relative linear or fore-aft movement or translation between the rails of the seat slide mechanism when disposed in the latched position and the isolator activated or not locked with the isolator using the seat slide mechanism to constrain travel of the isolator in a linear fore-aft direction.

Other advantages, benefits and features of the present invention will become apparent to those skilled in the art upon reading the detailed description and viewing the related drawings.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION OF THE INVENTION

FIGS. 1-4 illustrates a preferred embodiment of a vibration isolating seat position adjuster 40 of the present invention that preferably is part of a vehicle seat assembly 45 that is assembled to a vehicle, such as an off-road vehicle or the like, to provide fore-aft vehicle seat position adjustment along with isolation of vibration caused by longitudinal and/or lateral accelerations typically encountered during vehicle operation providing improved seat occupant comfort. The vibration isolating seat position adjuster 40 preferably includes an upper housing 42 carrying a fore-aft seat position adjustment and vibration isolating assembly 50 equipped with a fore-aft seat position adjuster 52 used to set fore-aft vehicle seat position, a vibration isolator 54 that isolates vibration encountered during vehicle operation, and a vibration isolator lockout 55 used to de-activate the vibration isolator 54 when not desired or needed.

The upper housing 42 includes a generally horizontally extending mounting bracket 47 to which the seat position adjustment and vibration isolating assembly 50 is mounted and which also is attached to one of a pair of fore-aft extending seat slide mechanism 44 of such a vehicle seat assembly 45 to provide fore-aft seat position adjustability thereto. While the mounting bracket 47 of the upper housing 42 of the vibration isolating seat position adjuster 40 can extend between both of the seat slide mechanisms 44 and underlie, preferably even carry, a vehicle seat (not shown) of the vehicle seat assembly 45, upper housing mounting bracket 47 can be attached to a single seat slide mechanism 44, such as in the manner depicted in FIG. 1, with a pan or base (not shown) of the vehicle seat overlying the bracket 47 and extending between the pair of seat slide mechanisms 44.

Seat slide mechanism 44 is disposed between the vehicle seat and a frame or chassis (not shown) of the vehicle with seat slide mechanism 44 preferably being a self-contained seat slide mechanism formed of a pair of fore-aft extending seat slide rails 46 and 48, e.g., upper rail 46 and lower rail 48, movably interlocked with one another in a manner that permits fore-aft relative translation or movement therebetween enabling fore-aft seat movement. The position of one of the seat slide rails 46, e.g., upper rail 46, relative to the other one of the seat slide rails 48, e.g., lower rail 48, can be selectively fixed in a desired seat position by a seat occupant using the fore-aft seat position adjuster 52 of the present invention while sitting in the seat. The vibration isolator 54 preferably is integrally formed as part of the seat position adjuster 52 and helps isolate the seat occupant from vibration, bumps, jolts, and the like typically encountered during vehicle operation advantageously preventing them from being felt by the seat occupant and/or at least reducing their transmission to the seat occupant. Where vibration isolation is not desired or needed, the vibration isolator 54 can be de-activated by the seat occupant operating the vibration isolator lockout 55 while sitting in the seat that locks the vibration isolator 54 preventing the vibration isolator 54 from providing vibration isolation.

In the preferred seat slide mechanism 44 shown in the drawings, the upper rail 46 can be and preferably is configured for mounting vehicle seat thereto and the lower rail 48 can be and preferably is configured for mounting to part of an underlying vehicle frame or chassis. If desired, lower rail 48 of each seat slide mechanism 44 can be mounted to a vehicle seat suspension that is in turn mounted to the vehicle frame or chassis. In a preferred embodiment, vehicle seat assembly 45 can and preferably does include a vehicle seat supported by a vehicle seat suspension such that vehicle seat assembly 45 is of a construction in accordance with that shown and described in commonly owned U.S. Pat. Nos. 5,927,679 and 6,935,693, the entire disclosure of each of which is hereby expressly incorporated herein by reference.

In a preferred embodiment, seat slide mechanism 44 is configured to permit translation of the upper rail 46 as much as ±100 millimeters in an axial or fore-aft direction from a central position with respect to the fixed lower rail 48 that preferably is fixed by being grounded to part of the vehicle frame or chassis. It is contemplated that other slide mechanism configurations and arrangements can be used with the present invention including slide mechanism embodiments having a greater or lesser amount of translation between the seat slide rails 46 and 48 to accommodate or provide a greater or lesser amount of fore-aft seat position travel and/or seat position adjustment as well as to produce a seat position adjustment and vibration isolating assembly 50 of the present invention having a vibration isolator 54 that provides a greater or lesser amount of vibration isolator travel.

In a preferred embodiment, the vibration isolating seat position adjuster 40 is of modular construction formed of at least the fore-aft seat position adjuster 52 and vibration isolator 54 mounted to bracket 47 of housing 42 that preferably is pre-assembled as a module 40 that can be mounted to a seat slide mechanism 44 of vehicle seat assembly 45 during assembly thereof. In another preferred embodiment, such a preassembled vibration isolating seat position adjuster 40 also includes the vibration isolator lockout 55.

As such, although not shown, vehicle seat assembly 45 can and preferably does employ another fore-aft extending slide mechanism that is substantially the same as seat slide mechanism 44 shown in FIGS. 1-4 that also is formed of a second pair of movably interlocked upper and lower seat slide rails, e.g., upper and lower rails 46 and 48, spaced laterally from and generally parallel to the pair of movably interlocked upper and lower seat slide rails 46 and 48 of seat slide mechanism 44 shown in FIGS. 1-4. Although also not shown, the generally horizontal mounting bracket 47 of the upper housing 42 can extend if desired from the seat slide mechanism 44 shown in FIGS. 1-4 laterally outwardly, e.g., in a direction transverse to the fore-aft direction, to the other seat slide mechanism (not shown) of vehicle seat assembly 45. In such a configuration, vehicle seat (not shown) can be carried by the upper housing 42 and even can be mounted to the upper housing 42 if desired.

Figure 1:
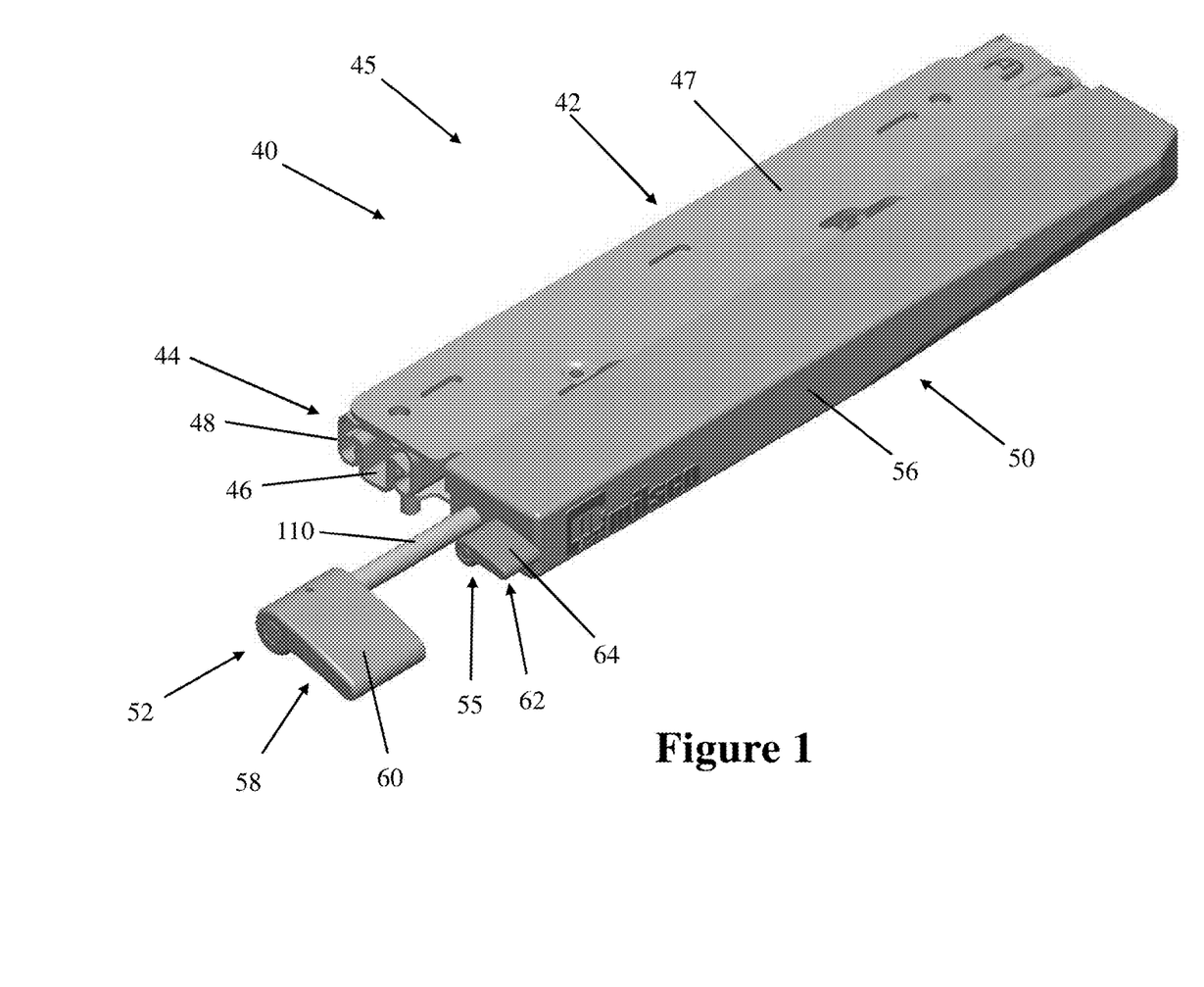
FIG. 1 is a top front perspective view of part of a vehicle seat assembly illustrating a seat position adjuster of the present invention equipped with an integral vibration isolator and an isolator lockout to de-activate vibration isolation when desired.

In a preferred embodiment, the vibration isolating seat position adjuster 40 is a self-contained module that includes a position adjustment and vibration isolating assembly 50 that is formed of fore-aft seat position adjuster 52, vibration isolator 54, and vibration isolator lockout 55, which are all mounted to or otherwise carried by the mounting bracket 47 of the housing 42 with the bracket 47 being used to mount the module 40 to one of the seat slide mechanisms 44 of a vehicle seat assembly 45. As is shown in FIG. 1, the position adjustment and vibration isolating assembly 50 and part of the mounting bracket 47 are housed in a protective shroud 56 disposed alongside, e.g., outboard, of seat slide mechanism 44. If desired, the shroud 56 and position adjustment and vibration isolating assembly 50 can be disposed between or interjacent the seat slide mechanisms 44 of vehicle seat assembly 45.

Figure 2:
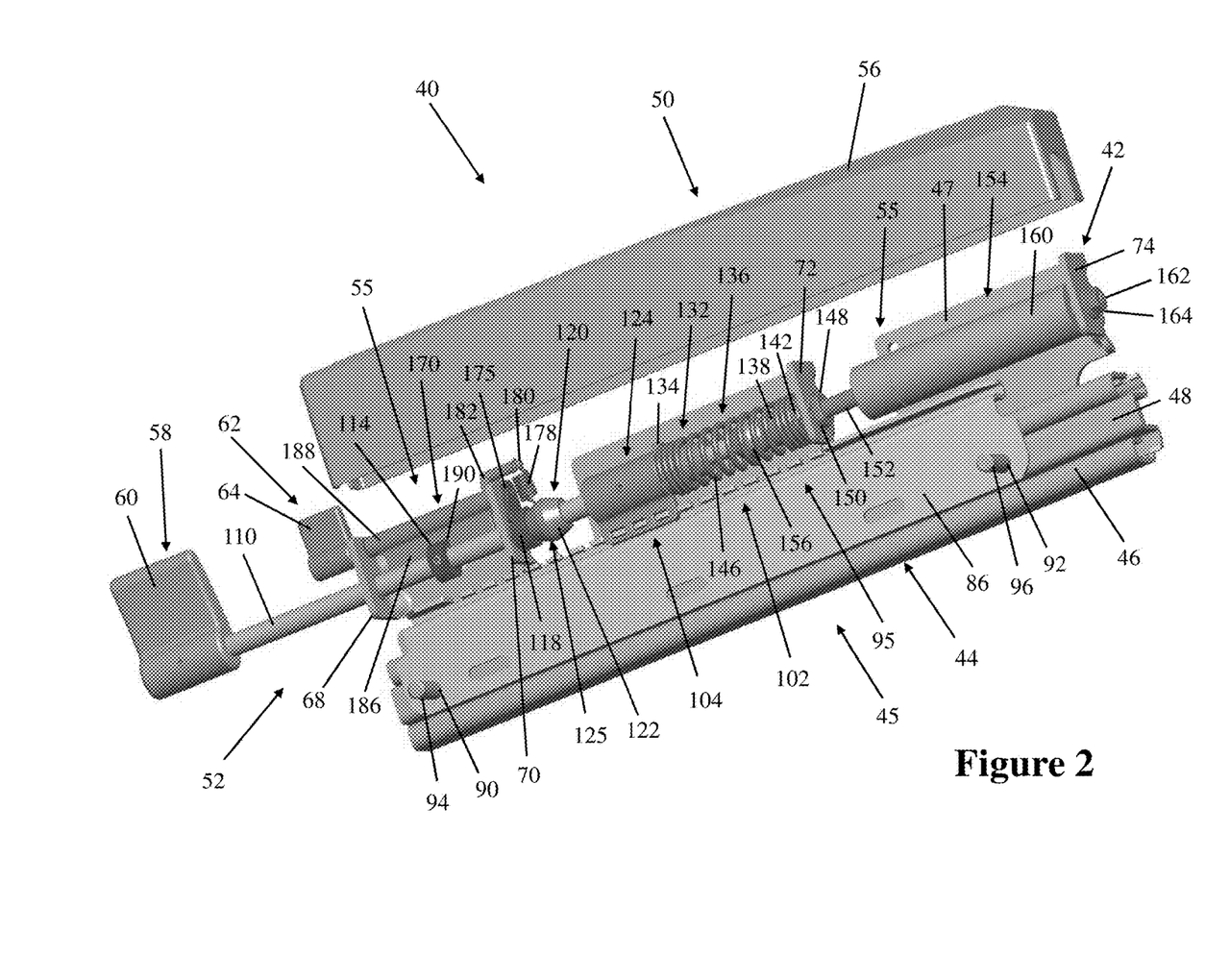
FIG. 2 is a partially exploded bottom perspective view of the seat position adjuster of FIG. 1 with a protective shroud exploded from the rest of the seat position adjuster illustrating the seat position adjuster, isolator, and isolator lockout in more detail along with a mounting bracket of a seat position adjuster housing to which the seat position adjuster, isolator, and isolator lockout are mounted.
Figure 3:
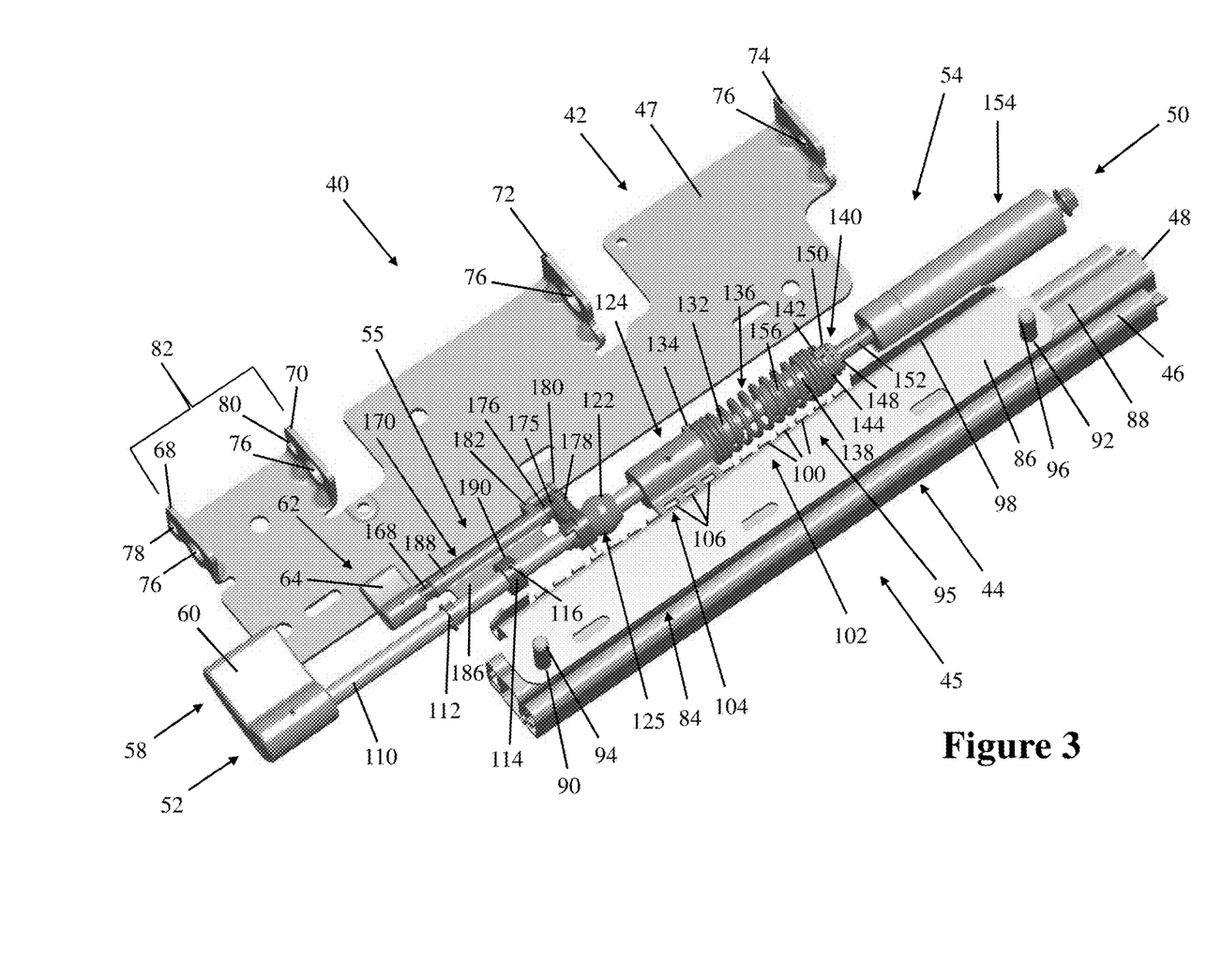
FIG. 3 is a second partially exploded bottom perspective view of the seat position adjuster of FIG. 1 with the shroud removed and the seat position adjuster mounting bracket exploded to show the mounting bracket, seat position adjuster, isolator and isolator lockout in further detail.

The seat position adjuster 52 is elongate and disposed alongside, e.g., outboard, the rails 46 and 48 of seat slide mechanism 44 but can be disposed between seat slide mechanisms 44 of seat assembly 45 if desired. The position of a vehicle seat of vehicle seat assembly 45 relative to the vehicle chassis or frame is selectively adjustable between one of at least a plurality of pairs, i.e., at least three, fore-aft seat positions by a seat occupant using the seat position adjuster 52 while sitting in the seat. As discussed in more detail below, the mounting bracket 47 of housing 42 is fixed to one of the rails, preferably upper rail 46, and the seat position adjuster 52 is configured to operably cooperate with the other one of the rails, preferably lower rail 48, preferably via operative engagement therewith, to releasably fix or ground the rails 46 and 48 to one another to set seat position in a desired fore-aft position by preventing relative movement or translation between the rails 46 and 48. xxx As is best shown in FIGS. 2 and 3, the seat position adjustment and vibration isolating assembly 50 is carried by the upper housing 42, preferably mounted to generally horizontal mounting bracket 47 three dimensionally formed to produce a mounting arrangement 66 to which the fore-aft seat position adjustment and vibration isolating assembly 50 is mounted. Mounting arrangement 66 includes at least a plurality, preferably at least a plurality of pairs, i.e., at least three, of fore-aft spaced apart and fore-aft aligned position adjuster mounts 68, 70, 72 and 74, which extend outwardly from bracket 47 preferably extending downwardly away from the vehicle seat. In a preferred embodiment, each mount 68, 70, 72 and 74 is or includes a generally square, e.g., rectangular, mounting tab or flange that extends, e.g., is bent, downwardly and generally at a right angle relative to the generally horizontal mounting bracket 47 of housing 42. As also shown in FIG. 3, each one of the mounts 68, 70, 72 and 74 can and preferably does have a through-opening 76 through which extends a respective portion of the fore-aft seat position adjustment and vibration isolating assembly 50 when mounted or assembled to bracket 66. A forward-most located pair of the mounts 68 and 70 respectively each include a vibration isolator mounting seat 78 and 80 collectively defining a vibration isolator cradle 82 to which vibration isolator 54 is mounted or assembled.

With continued reference to FIGS. 2 and 3, the fore-aft seat position adjustment and vibration isolating assembly 50 is grounded to the upper housing 42 and disposed in operable cooperation with one of the slide rails, preferably lower rail 48, of the seat slide mechanism 44 in a manner that enables one of the rails, e.g., lower rail 48, to be selectively fixed in a desired position relative to the other one of the rails, e.g., upper rail 46, by a seat occupant manually operating the seat position adjuster 52 to perform fore-aft seat position adjustment. While the one slide rail, e.g., lower rail 48, with which the seat position adjuster 52 operably cooperates during operation of the position adjuster 52 to selectively fix its position relative to the other slide rail, e.g., lower rail 48, can be three-dimensionally formed or contoured, e.g., formed with fore-aft spaced apart teeth, in a manner to enable part of the position adjuster 52 to directly engage the one rail, e.g., lower rail 48, to fix its position relative to the other rail, e.g., upper rail 46, a separate seat position adjuster rack bracket 84 can be used to operatively connect the two to fix fore-aft seat position. In the preferred embodiment shown in the drawing figures, such a separate bracket 84 preferably operatively connects part of the position adjuster 52 to the one slide rail, e.g., lower rail 46, when the adjuster 52 is disposed in a latched position that prevents relative movement between the rails 46 and 48 thereby preventing fore-aft seat movement. As discussed in more detail below, in such a preferred embodiment, the part of the position adjuster 52 operatively connected by the bracket 84 to rail 46 is a seat position locking latch 104 of the adjuster 52 that engages part of bracket 84 when adjuster 52 is disposed in the latched position.

Still referring to FIGS. 2 and 3, the seat position adjuster rack bracket 84 is elongate and has a generally planar fore-aft extending mounting plate 86 that overlies and preferably directly overlaps a generally transversely extending flat bottom 88 of one of the slide rails, preferably lower rail 48, to which the rack bracket mounting plate 86 is immovably fixed. While the rack bracket mounting plate 86 can be formed with spaced apart bores 90 and 92 that respectively receives a corresponding slide rail mechanism mounting or anchoring post 94 and 96 extending outwardly from the bottom 88 of the one slide rail, e.g., lower rail 48, substantially immovably fixing the rack bracket 84 to the one rail, e.g., lower rail 48, the rack bracket 84, preferably its mounting plate 86, preferably is immovably fixed thereto by welding. In a preferred embodiment, mounting plate 86 of rack bracket 84 is fixedly attached to the seat slide mechanism 44, preferably to one of its rails 48, by at least one weld (not shown) and preferably by at least a plurality of welds (not shown).

Seat position adjuster rack bracket 84 has an elongate fore-aft extending downturned flange 98 that not only stiffens, strengthens and/or structurally rigidifies the bracket 84, but which also is configured with a latch engagement arrangement 95 that is configured to be engageable with or by the latch 104 of the position adjuster 52. In a preferred embodiment, the latch engagement arrangement 95 is formed of part of the flange 98 that is three dimensionally formed or contoured in a manner that defines at least a plurality, preferably at least a plurality of pairs, i.e., at least three, of spaced apart teeth 100, which are engageable by the latch 104 of the seat position adjuster 52 to fix fore-aft seat position in one of at least a plurality of fore-aft seat adjustment positions. In the preferred embodiment shown in the drawing figures, the latch engagement arrangement 95 is formed of a toothed portion of the flange 98 that defines a fore-aft extending toothed rack 102 having at least five teeth 100, preferably having at least ten teeth 100, more preferably having at least fifteen teeth 100, which are engageable by the seat position adjuster latch 104 to fix fore-aft seat position in one of at least a plurality of pairs, i.e. at least three, of fore-aft seat positions when the adjuster 52 is disposed in the latched position. Flange 98 and toothed rack 102 extend alongside both the seat slide mechanism 44 and the seat position adjuster 52 with flange 98 and toothed rack 102 disposed between or interjacent the slide mechanism 44 and position adjuster 52.

With continued reference to FIGS. 2 and 3, the latch 104 of the seat position adjuster 52 has at least one, preferably at least a plurality, and more preferably at least a plurality of pairs, i.e., at least three, of fore-aft spaced apart seat position detents 106 each of which is three dimensionally contoured or otherwise configured to engage with a corresponding tooth 100 of rack 102 of rack bracket 84 when the position adjuster 52 is disposed in a latched position, such as the latched position shown in FIG. 3, to prevent relative movement between the rails 46 and 48 of slide mechanism 44 to fix seat position. Each detent 106 of the seat position adjuster latch 104 preferably is three dimensionally contoured or configured to receive a corresponding tooth 100 of rack 102 of bracket 84 when the position adjuster 52 is disposed in the latched position. Each detent 106 of latch 104 preferably is or includes a recess, notch or aperture that is three dimensionally contoured or configured to receive a corresponding tooth when latch 104 is latched onto rack 102 of bracket 84. In the preferred embodiment shown in the drawing figures, each detent 106 is an aperture formed in the latch 104 that can and preferably does extend completely through the latch 104.

It should be recognized that a fore-aft seat position adjustment and vibration isolating assembly 50 constructed in accordance with the present invention can employ a different latch arrangement and/or a different latch engagement arrangement. In this regard, it is contemplated that latch of seat position adjuster 52 can be configured with one or more teeth that engage latch engagement arrangement configured with teeth receivers of recessed, notched or apertured construction that receive the one or more teeth of such a latch to fix fore-aft seat position by preventing relative slide rail movement when adjuster 52 is latched. Other latch, latching and latch engagement configurations are possible and therefore also contemplated as being within the scope of the present invention.

The seat position adjuster 52 has a seat occupant manipulable seat position adjuster control 58, such as in the form of a grip 60, e.g., paddle-type handle, disposed externally of shroud 56 that is accessible, graspable, and manipulable, e.g., manually rotatable, by a seat occupant while sitting in a seat of a vehicle seat assembly 45 equipped with a fore-aft seat position adjustment and vibration isolating assembly 50 of the present invention thereby enabling the seat occupant to adjust the fore-aft position of the seat while the seat occupant is sitting in the seat. Such a fore-aft seat position adjustment and vibration isolating assembly 50 of the present invention is equipped with a vibration isolator lockout 55 that also has a seat occupant manipulable control 62, such as in the form of a grip 64, e.g., paddle-type handle, also disposed externally of shroud 56 that also is accessible, graspable, and manipulable, e.g., manually rotatable, by such a seat occupant while sitting in the seat enabling the seat occupant to activate or de-activate the vibration isolator 54 while sitting in the seat.

Figure 4:
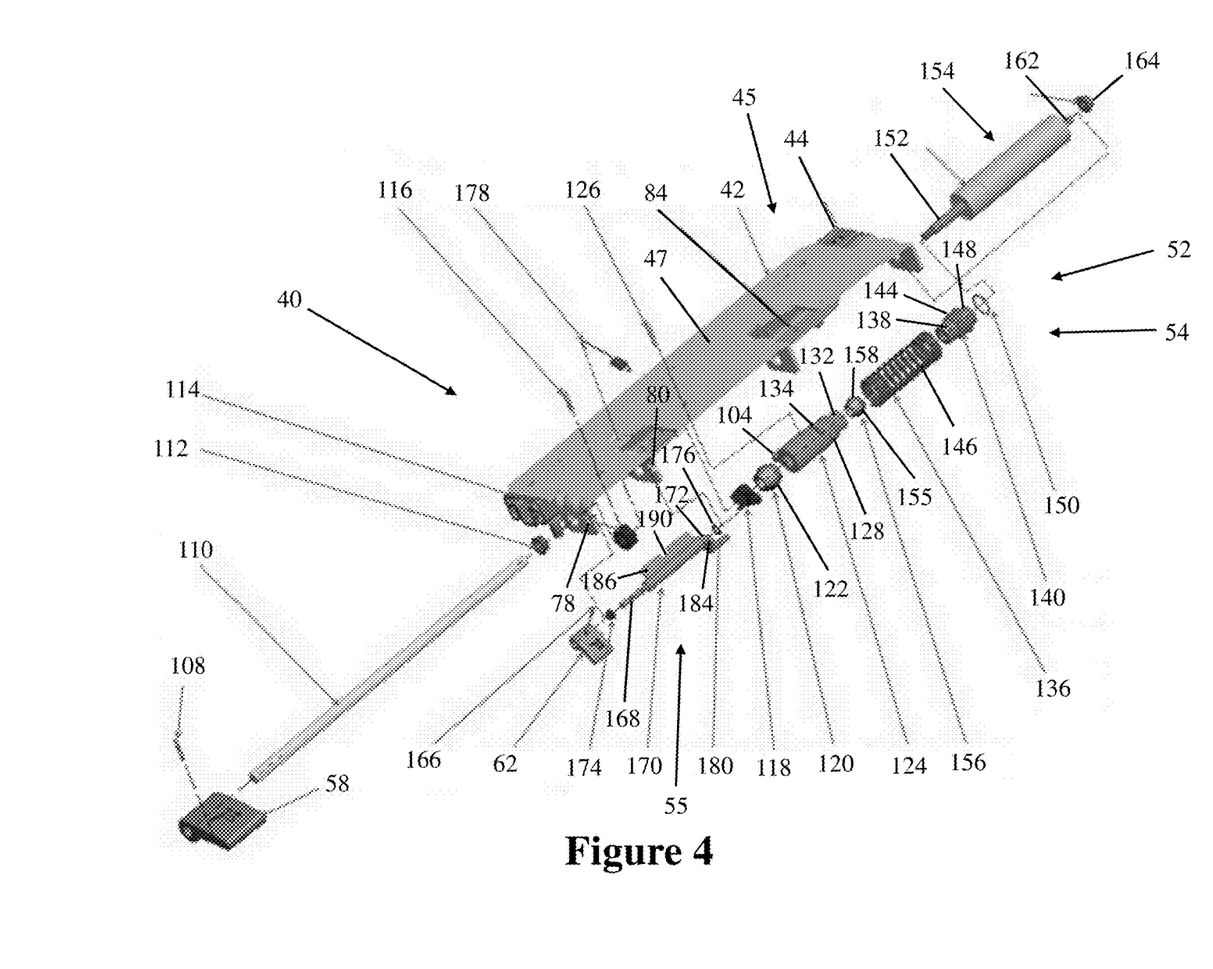
FIG. 4 is a top left side exploded perspective view of the seat position adjuster of FIG. 1 with the shroud removed for clarity.

As shown in FIG. 4, the manipulable control 58 of the seat position adjuster 52 is axially and rotationally fixed by a self-retaining cross pin 108 or the like to one end of an elongate rotary seat position control shaft 110 that extends through and is supported by at least a plurality, preferably a plurality of pairs, i.e., at least three, of the position adjuster mounts 68, 70 and/or 72 of the seat position adjuster module mounting bracket 47 to which the adjuster 52 is mounted. In a preferred embodiment where a self-retaining cross pin 108 is used, the pin 108 is either a groove pin or a spring pin.

The generally cylindrical seat position adjuster control shaft 110 is rotatively supported at or adjacent the end carrying the manipulable control 58 by a first bearing 112, preferably a self-retaining flange bearing, seated in opening 76 in forward-most located mount 68. Part of the control shaft 110 extending between mounts 68 and 70 carries an annular lock collar 114 of the vibration isolator lockout 55. Lock collar 114 can be and preferably is axially and rotationally fixed to the shaft 110 by another self-retaining cross pin 116 or the like. Where a self-retaining cross pin 116 is used, the pin 116 can either be a groove pin or a spring pin.

As best shown in FIG. 2, the control shaft 110 is further rotatively supported by a second or intermediate bearing 118 seated in opening 76 in a first intermediate mount 70 that is disposed between forward-most located mount 68 and rearward-most located mount 74. Carried by the shaft 110 between first intermediate mount 70 and latch 104 is a first or forward-most located impact load absorbing bumper 120, preferably in the form of an annular or tubular elastomeric bumper 122 made of rubber or a synthetic compressible and resilient material, which helps reduce the magnitude of impact loads and other types of large shocks encountered during vehicle operation that are transmitted via the seat position adjuster 52 to the seat occupant. Bumper 120 is mounted to the shaft 110 in a manner that (i) axially fixes the bumper 120 thereto causing the bumper 120, to move axially substantially in unison with axial movement of the shaft 110, and (ii) allows relative rotation between the bumper 120 and the shaft 110. In other words, the bumper 120 is mounted to the shaft 110 in a manner that causes the bumper 120 to move back and forth with the shaft 110 but allows the bumper 120 to rotate on the shaft 110.

Bumper 120 serves as an impact load absorbing forward stop 125 of the seat position adjuster 52 that reduces the magnitude of fore-aft acceleration and/or jerk of shock and/or impact loads transmitted to the seat occupant during vehicle operation when rearward movement of the upper housing 42 (and vehicle seat carried by upper housing 42) relative to the latched seat slide mechanism 44 caused by such an impact load or shock causes the bumper 120 to abut or stop against bearing 118 and/or mount 70. As such, bumper 120 thereby functions as an impact load absorbing forward travel-limiting stop 125 that limits forward movement or forward travel of the latched seat slide mechanism 44 relative to the upper housing 42 (and seat carried by housing 42) during vehicle operation. Bumper 120 preferably does so by limiting forward movement or forward travel of the control shaft 110 when the seat adjuster 52 is disposed in the latched position by limiting forward movement or forward travel of the shaft 110 caused by shock or impact loads transmitted thereto from the vehicle through the locked rails 46 and 48 of the seat slide mechanism 44 during vehicle operation. In doing so, bumper 120 preferably absorbs, dampens and/or otherwise reduces the magnitude of the impact forces and accelerations from such impact loads that are transmitted to the seat occupant.

The seat position locking latch 104 extends radially outwardly from an elongate generally cylindrical and tubular latch cylinder 124 that is axially and rotationally fixed to the control shaft 110 by a self-retaining cross pin 126 or the like. In a preferred embodiment where a self-retaining cross pin 126 is used, the pin 126 is either a groove pin or a spring pin.

As best shown in FIG. 4, the latch cylinder 124 has a radially outwardly extending counter-rotation stop 128 in the form of an arm that extends radially outwardly from the cylinder 124 that is circumferentially or angularly spaced or offset from latch 104 that limits rotation of the control shaft 110 in a direction counter or opposite that which causes the latch 104 to engage with teeth 100 of rack 102 of bracket 84 and lock fore-aft seat position. When the manipulable control 58 is grasped and rotated away from the latched position causing the control shaft 110 to rotate substantially in unison therewith, the rotation stop 128 abuts against part of the upper housing 42 to prevent over rotation and/or prevent damage to the latch 104, to another part of the position adjuster 52, and/or to the vibration isolator 54.

Disposed at or adjacent an aft end of the latch cylinder 124 is a forward spring seat 132 formed by a generally cylindrical portion of the latch cylinder 124 over which telescopes a forward portion of a resilient biasing element that preferably is a torsional biasing element that more preferably is a spring 136 and which includes a radially outwardly extending spring stop 134 against which a forward axial end of the spring 136 abuts or stops. An aft portion of the isolation spring 136 is telescoped over an aft spring seat 138 integrally formed of or by the exterior of an aft spring anchor control shaft bearing 140 seated in opening 76 in a second intermediate mount 72 of mounting bracket 47 of housing 42 that is disposed between first intermediate mount 70 and rearward-most mount 74 of mounting bracket 47 of housing 42.

Spring 136 preferably is a coil spring captured between the spring stop 134 and rear radial edge of the latch 104 of the latch cylinder 124 and a radially outwardly extending spring stop 142 of a seating collar 144 of bearing 140. In a preferred embodiment, spring seat 132 preferably is a torsion spring seat that includes a helical spring wire seating groove (not shown) formed in an exterior or outer surface, e.g., outer wall, of latch cylinder 124, which is complementary to the helical winding of a wire 146 helically wound to form helically wound spring 136 with the spring stop 134 formed as spring wire abutment disposed at an end of the groove against which a free end of the wire 146 abuts when the spring 136 is seated on seat 132. Aft spring seat 138 of shaft bearing 140 can also be configured as a torsion spring seat having a construction substantially identical to the torsion spring seat 132 of latch cylinder 124 if desired. Where both spring seats 132 and 138 are torsion spring seats, one end of the helically wound wire 146 that forms spring 136 abuts against one spring stop 134, which serves as a first torsion spring stop, and an opposite end of the helically wound wire 146 of the spring 136 abuts against the other spring stop 142, which serves as a second torsion spring stop.

Spring 136 is captured in torsion by spring seats 132 and/or 138 thereby defining a torsional biasing element that torsionally or rotatively biases the latch cylinder 124, and hence the latch 104, toward the latched position thereby urging the latch 104 into engagement with teeth 100 of rack 102 of bracket 84. The torsion force applied by the spring 136 to the latch cylinder 124 when the latch 104 is disposed in the latched position releasably retains the latch 104 disposed in engagement with teeth 100 of rack 102 of bracket 84 until seat occupant manipulates the seat position adjuster control 58 to rotate the control shaft 110 away from the latched position with enough force to overcome the torsional biasing force applied by spring 136.

As discussed in more detail below, spring 136 not only is a torsional biasing element that urges latch 104 toward latched position, but spring 136 also functions as an isolation biasing element of the isolator 54 that is generally coaxially carried on the control shaft 110 that is captured in either tension or compression between latch cylinder 124 and aft spring anchor control shaft bearing 140 and/or intermediate mount 72 of position adjuster mounting bracket 47 of housing 42. Spring 136 therefore substantially simultaneously functions as and thereby defines (a) a torsion spring that urges latch 104 towards latched position, and (b) an isolation spring that is stretchable and/or compressible in response to relative movement between control shaft 110 and housing 42 caused by forces from vibration, longitudinal acceleration(s), e.g., in a fore-aft direction, and/or lateral accelerations, in direction generally transverse to the fore-aft direction, encountered during vehicle operation.

The aft spring anchor control shaft bearing 140 is fixedly seated in opening 76 of second intermediate mount 72 of mounting bracket 47 of housing 42 and provides a generally cylindrical axially extending bearing guide through-bore that telescopically slidably receives part of a generally cylindrical shaft that can be an aft portion of the seat position adjuster control shaft 110, but which preferably slidably telescopically receives a forwardly extending portion of a reciprocable piston rod 152 of a damper 154 whose free end of the damper piston rod 152 is disposed axially inline with an aft end of the control shaft 110. Shaft bearing 140 has a rearwardly extending diametrically necked down generally cylindrical tubular bearing mounting stem 148 received through opening 76 in second intermediate mount 72 until seating collar 144 abuts against one side of mount 72. The bearing mounting stem 148 of the bearing 140 preferably extends rearwardly in a direction opposite that of the aft spring seat 138 of bearing 140. The bearing 140 preferably is fixed or otherwise grounded to the mount 72 by a retaining ring 150 or the like that is attached to a portion of the bearing mounting stem 148 extending beyond the other side of mount 72.

Such an aft spring anchor control shaft bearing 140 serves as a reciprocable control shaft and damper piston rod guide that enables one or both coaxially aligned shafts 110 and/or 152 to slidably telescopically reciprocate therethrough to accommodate movement of the shafts 110 and 152 relative to housing 42 caused by vibration and/or acceleration(s) as well as by movement of one of the locked rails 46 and 48 of the slide mechanism 44, engaged latch 104, latch cylinder 124, and/or control shaft 110 relative to upper housing 42 and/or vehicle seat. Coaxially aligned shaft bearings 112 and 140 axially slidably guides control shaft 110 and damper piston rod 152 during axial reciprocable movement of the shaft 110 and rod 152 substantially in unison caused by vibration, acceleration(s), impact loads, bumps, jolts, shocks or the like that cause relative movement between (i) the locked slide mechanism 44, control shaft 110 and/or damper shaft 152, and (ii) the housing 42 and/or seat. In a preferred embodiment, the aft axial end of the control shaft 110 is operably coupled to the forward axial end of the damper piston rod 152, such as by being operatively connected, e.g., fixed, to one another at or adjacent their respective opposed axial shaft ends. In one such preferred embodiment, the aft axial end of the control shaft 110 abuts against and is operably coupled to the front axial end of the damper shaft 152 such that both shafts 110 and 152 reciprocate substantially in unison during relative movement between (i) the locked slide mechanism 44, control shaft 110 and damper shaft 152, and (ii) the housing 42 and seat carried by and/or grounded to housing 42.

When spring 136 is functioning as an isolation biasing element, preferably isolation spring, of the isolator 54, spring 136 operates in tension and/or compression as a stretchable and/or compressible isolation biasing element or isolation spring that isolates the position adjuster control shaft 110 from housing 42 when latch 104 is disposed in the latched position. Such isolation provided by spring 136 when acting as an isolation biasing element or isolation spring of isolator 54 isolates the housing 42 and seat occupant from vibration encountered by the vehicle during operation that would ordinarily be transmitted via the frame or chassis through the locked rails of seat slide mechanism 44 to the vehicle seat and seat occupant sitting in the seat. Such isolation provided by spring 136 when acting as an isolation biasing element or isolation spring of isolator 54 also isolates the housing 42 and seat occupant from forces caused by lateral accelerations and/or longitudinal accelerations, including those from bumps, jolts, shocks and the like encountered by the vehicle during operation that cause relative movement between the control shaft 110 and housing 42 with the spring 136 in opposition to such forces thereby reducing the magnitude of such forces actually reaching the seat occupant.

Spring 136 advantageously not only functions as a torsion spring that torsionally or rotationally biases the latch 104, latch cylinder 124 and control shaft 110 toward the latched position but spring 136 can and preferably does also substantially simultaneously serve as an isolation spring during operation of isolator 54 with the spring 136 generally coaxial with control shaft 110 and acting in compression and/or tension to oppose relative movement between (i) the latch 104, latch cylinder 124 and control shaft 110, and (ii) the upper housing 42 and vehicle seat thereby improving seat occupant comfort. In a preferred embodiment, during operation of isolator 54, spring 136 is stretched or compressed depending on the direction of movement of the control shaft 110 relative to the housing 42 in response to forces encountered due to longitudinal or fore-aft accelerations. When the spring 136 is compressed during isolator operation, the spring 136 exerts a force opposing longitudinal force encountered by the vehicle and/or vehicle seat assembly during operation tending to compress the spring 136. When the spring 136 is stretched during isolator operation, the spring 136 exerts a force opposing longitudinal force encountered by the vehicle and/or vehicle seat assembly during operation tending to stretch the spring 136.

Carried by the control shaft 110 and/or damper shaft 152 between first or forward-most intermediate mount 70 and second or aft intermediate mount 72 is a second or aft impact load or shock absorbing bumper 156 that preferably is in the form of another annular or tubular elastomeric bumper 158 that provides an impact load absorbing rearward stop 155 that abuts or stops against aft spring anchor control shaft bearing 140 and/or second or aft intermediate mount 72 thereby limiting rearward movement or rearward travel of the latched seat slide mechanism 44 relative to the upper housing 42 (and seat carried by housing 42). Aft bumper 156 is mounted to control shaft 110 and/or damper shaft 152 in a manner that (i) axially fixes it thereto causing the bumper 156 to move axially in unison with axial movement of the shaft 110 and/or shaft 152, and (ii) allows the bumper 156 to rotate on the shaft 110 and/or shaft 152 to which the bumper 156 is mounted. In serving as a rearward travel-limiting stop 155, bumper 156 absorbs, dampens and/or otherwise reduces the magnitude of the impact forces and accelerations from such impact loads that are transmitted to the seat occupant.

The damper 154 is disposed at the aft end of the seat position adjuster 52 and preferably is a viscous damper that more preferably is a hydraulic damper. Damper 154 has a fluid-filled cylinder 160 with a reciprocable damper shaft 152, e.g., damper piston rod, extending outwardly from one damper cylinder end and which is grounded at an opposite damper cylinder end to the upper housing 42 by being fixed to aft mount 74. Damper cylinder 160 can and preferably does have a threaded mounting stud 162 extending outwardly therefrom that extends through opening 76 in aft mount 74 to which a fastener 164, preferably a threaded nut, e.g., flange lock nut, is threaded fixing the cylinder 160 to mount 74. Damper 154 is mounted to aft mount 74 and disposed between mounts 72 and 74 with the damper 154, damper cylinder 160, and damper piston rod or shaft 152 disposed in a fore-aft direction inline with control shaft 110, isolator spring 136, and isolator lock collar 114.

Damper 154 provides a velocity dependent force that opposes the force caused by the longitudinal acceleration of the suspended mass of the seat occupant and the seat during normal vehicle operation helping to thereby improve seat occupant comfort. The damper piston rod or shaft 152 preferably is axially anchored to control shaft 110 for reciprocable movement in unison therewith such that the damper 154 and its shaft 152 are disposed generally coaxial with control shaft 110, isolator spring 136, and isolator lock collar 114 so that fore-aft axial travel of damper shaft 152 is equal to travel of the vibration isolator 54 during operation.

Seat position adjustment and vibration isolating assembly 50 also is equipped with a vibration isolator lockout 55 that also has a seat occupant manipulable vibration isolator lockout control 62, preferably in the form of a grip 64, e.g., handle, that is accessible, graspable, and manipulable, e.g., manually rotatable, by a seat occupant while sitting enabling the seat occupant to lockout the vibration isolator 54 of the seat position adjuster 52 by locking in place the axial position of the seat position adjuster control shaft 110 by axially grounding the control shaft 110 to the upper housing 42. A seat position adjustment and vibration isolating assembly 50 of the present invention has a vibration isolator 54 that is manually operable independently of the seat position adjuster 52 enabling fore-aft seat position to be set or adjusted independently of operation of vibration isolator 54.

Where the vibration isolating seat position adjuster 40 has an isolator 54 constructed without a damper 154, the axial length of the seat position adjuster control shaft 110 is increased so that the control shaft 110 extends through the aft spring anchor control shaft bearing 140 with an aft axial free end of the control shaft 110 extends outwardly beyond the bearing 140. In a preferred damper-less embodiment, the control shaft 110 preferably extends rearwardly through and beyond bearing with the aft axial end of the shaft 110 disposed between the bearing 140 and aft mount 74 or rear of the housing 42.

In one preferred embodiment of the vibration isolating seat position adjuster 40, forward-most located bumper 120 provides a rearward isolator travel stop that is designed to reduce impact loads induced by the isolator 54 reaching the end of available travel in a rearward direction and aft bumper 156 provides a forward isolator travel stop that is designed to reduce impact loads induced by the isolator 54 reaching the end of available travel in a forward direction. In another preferred embodiment of the vibration isolating seat position adjuster 40, forward-most located bumper 120 provides a forward isolator travel stop that is designed to reduce impact loads induced by the isolator 54 reaching the end of available travel in a forward direction and aft bumper 156 provides a rearward isolator travel stop that is designed to reduce impact loads induced by the isolator 54 reaching the end of available travel in a rearward direction.

As discussed in more detail below, the vibration isolator lockout 55 is manually operable by a seat occupant to ground the vibration isolator 54 to the upper housing 42 when it is desired to lockout the vibration isolator 54 preventing operation of the vibration isolator 54 such as when vibration isolation is not desired or needed. When vibration isolation is needed or desired, the seat occupant can manually operate the vibration isolator lockout 55 to un-ground the vibration isolator 54 from upper housing 42 allowing the vibration isolator 54 to operate and provide vibration isolation. Vibration isolator lockout 55 is manually operable independently of the seat position adjuster 52 thereby enabling operation of the vibration isolator 54 independently of the seat position adjuster 52.

The vibration isolator lockout 55 has an isolator lockout latch 170 used to lockout vibration isolation when vibration isolation is not needed or desired. As discussed in more detail below, the isolator lockout latch 170 is displaceable between (i) a locked position where the latch 170 grounds the seat position adjuster control shaft 110 to the upper housing 42 preventing vibration isolation by preventing relative movement therebetween, and (ii) an unlocked position where the latch 170 is disengaged from the seat position adjuster control shaft 110 permitting vibration isolation and relative movement between the seat position adjuster control shaft 110 and upper housing 43.

As shown in FIG. 4, the manipulable control 62 of the isolator lockout 55 is axially and rotationally fixed by a self-retaining cross pin 166 or the like to an elongate isolator lockout latch control shaft 168 that extends outwardly from one end of the vibration isolator lockout latch 170 used to lockout vibration isolation when the seat position adjuster 52 does not need to provide vibration isolation. The lockout latch 170 has a pivot shaft 172 extending outwardly from the latch 170 in a direction generally opposite the lockout latch control shaft 168 with the lockout latch 170 disposed between the first or forward-most located mount 68 and the first or forward-most located intermediate mount 70 of upper housing 42. Lockout latch control shaft 168 can be and preferably is generally coaxial with lockout latch pivot shaft 172.

The vibration isolator lockout latch 170 is rotatively supported by the mounts 68 and 70 of the upper housing 42 of vehicle seat assembly 45 with the lockout latch control shaft 168 rotatively supported in a first or forward-most located lockout latch bearing 174 received in first or forward-most lockout latch bearing seat 78 of mount 68, and the lockout latch pivot shaft 172 rotatively supported in a second or aft lockout latch bearing 176 received in second or aft lockout latch bearing seat 80 of mount 70. One or both bearings 174 and 176 can be a flange bearing and both bearings 174 and 176 preferably are flange bearings in a preferred embodiment. Aft lockout latch bearing 176 can be formed integrally with intermediate seat position adjuster control shaft bearing 118 but preferably is a separate component disposed in registry with an isolator lockout supporting portion 175 of the bearing 118 when aft lockout latch bearing 176 is seated in seat 80 of mount 70 of upper housing 42. Where aft lockout latch bearing 176 is a component separate from intermediate control shaft bearing 118, its lockout latch supporting portion 175 is disposed on one side of mount 70 and the aft lockout latch bearing 176 is seated in seat 80 on opposite side of mount 70. Part of the lockout latch supporting portion 175 of intermediate seat position adjuster control shaft bearing 118 can also be seated in seat 80 of mount 70 if desired.

The vibration isolator lockout latch 170 is biased by a radially extending biasing element that preferably is a biasing spring 178 connected in tension to part of the generally horizontally extending mounting bracket 47 of the housing 42 to urge the latch 170 toward either a latched position or an unlatched position. The lockout latch biasing spring 178 has one end attached to a spring mounting lever 180 that extends axially rearwardly from a radial lockout latch biasing arm 182 of the lockout latch 170 providing an over-center type latching function. The radial lockout latch biasing arm 182 preferably also has a lockout latch over-travel limiter 184 extending upwardly from the arm 182 towards the underside of the bracket 47 of housing 42 that abuts or stops against the housing 42 to prevent lockout latch over-travel, e.g., prevent lockout latch over-rotation, in a direction opposite the lockout latch locked position. An opposite end of the lockout latch biasing spring 178 is attached to part of the upper housing 42. Lockout latch biasing spring 178 has one end attached to spring mounting lever 180 extending radially across the position adjuster control shaft 110 where the opposite end of the spring 178 is attached to upper housing 42.

In a preferred embodiment, the lockout latch biasing spring 178 biases the lockout latch 170 towards an unlocked position enabling the seat position adjuster 52 to provide vibration isolation while the seat position latch 104 is disposed in a latched position that prevents fore-aft seat position adjustment. Where configured to automatically urge the lockout latch 170 toward the unlocked position, such a seat position adjustment and vibration isolating assembly 50 constructed in accordance with the present invention requires the seat occupant to manually manipulate the lockout latch control 62 to engage the lockout latch 170 with the seat position control shaft 110 when the seat occupant desires to de-activate vibration isolation.

In another preferred embodiment, the lockout latch biasing spring 178 biases the lockout latch 170 towards the locked position grounding the seat position adjuster control shaft 110 to the upper housing 42 thereby preventing the seat position adjuster 52 from providing vibration isolation while the seat position latch 104 is disposed in a latched position that prevents fore-aft seat position adjustment. Where configured to automatically urge the lockout latch 170 toward the locked position, such a seat position adjustment and vibration isolating assembly 50 constructed in accordance with the present invention requires the seat occupant to manually manipulate the lockout latch control 62 to disengage the lockout latch 170 with the seat position control shaft 110 when the seat occupant desires to activate vibration isolation.

The vibration isolator lockout latch 170 has a generally rectangular latch plate 186 that extends radially outwardly from a generally cylindrical lockout latch cylinder 188 from which the lockout latch control shaft 168 and pivot shaft 172 oppositely outwardly extends and pivots. The latch plate 186 is three dimensionally contoured or configured to releasably lock the seat position adjuster control shaft 110 in place when deactivating vibration isolation. A preferred latch plate 186 is three dimensionally contoured or configured with a vibration isolator lock collar receptacle 190 that releasably receives the vibration isolator lock collar 114 axially fixed to the seat position adjuster control shaft 110 when the lockout latch 170 is disposed in the locked position. In such a preferred embodiment, the lock collar receptacle 190 is a generally rectangular lock collar locking slot or channel formed in the latch plate 186 that is defined by a pair of spaced apart generally parallel lock collar abutment edges that capture or bracket the lock collar 114 therebetween when the lockout latch 170 is disposed in the locked position.

The lockout latch cylinder 188 has a pair of axial ends with a first or forward-most end of the latch cylinder 188 adjoining or disposed in abutment with first or forward-most located mount 68 of upper housing 42 and a second or aft end of the latch cylinder 188 adjoining or disposed in abutment with first intermediate mount 70 of upper housing 42. When assembled to the upper housing 42, the cylinder 188 of the lockout latch 170 is pivotally or rotatively captured between the mounts 68 and 70 of the upper housing 42 preferably with very little or substantially no play between each axial end of lockout latch cylinder 188 and the corresponding adjacent mount 68 and 70. As a result of the lockout latch cylinder 188 being bracketed at opposite ends by mounts 68 and 70 of upper housing 42, the lockout latch 170 grounds the seat position adjuster control shaft 110 and hence the seat position adjuster 52 to the upper housing 42 when the lock collar 118 fixed to shaft 110 is received in the collar locking slot or channel 192 of the latch plate 186 when the lockout latch 170 has been manually rotated by the seat occupant to the locked position.

When the lockout latch 170 of the vibration isolator lockout 55 is disposed in the locked position into engagement with the lock collar 118 fixed to the seat position adjuster control shaft 110, the shaft 110 is grounded to the upper housing 42 preventing axial movement of the shaft 110 relative to the housing 42. While axial movement of the shaft 110 relative to the housing 42 is prevented when the lockout latch 170 is locked, the shaft 110 can still rotate relative to the housing 42 thereby permitting the seat position locking latch 104 be rotated between the latched position that prevents relative axial or fore-aft movement between the seat slide rails 46 and 48 of the seat slide mechanism 44 fixing fore-aft seat position and an unlatched position that allows relative axial or fore-aft movement between the rails 46 and 48 permitting fore-aft seat movement. As such, when the vibration isolator lockout 55 is locked when the vibration isolator lockout latch 170 is disposed in the locked position, fore-aft seat adjustment can still be performed by a seat occupant manipulating the seat position adjuster control 58 such that operation of the seat position adjuster 52 is independent of the vibration isolator lockout 55. Conversely, seat occupant is able to manipulate the vibration isolator lockout control 62 to lock or unlock the lockout latch 170 of the vibration isolator lockout 55 whether the seat position locking latch 104 is latched fixing fore-aft seat position or unlatched allowing fore-aft seat position adjustment. In other words, as previously indicated, operation of the vibration isolator lockout 55 and seat position adjuster 52 is independent of one another.

A modular forward and rearward seat position adjustment system 40 constructed in accordance with the present invention has fore-aft seat position adjuster 52 with an integral seat vibration isolation system or vibration isolator 54, which utilizes only a single spring 136 that provides both longitudinal acceleration isolation and fore/aft seat position adjustment latch biasing force. A damper 154, preferably a hydraulic damper, can be mounted co-axial to the single spring 136 to further improve isolation. The forward and rearward seat position adjustment system 40 is coupled to a mechanical seat slide mechanism 44 that is used not only to provide or enable fore-aft position seat position adjustment but which also employs the seat slide mechanism 44 as an isolator guide to also guide or constrain movement or travel of the isolator 54 in a linear fore-aft direction generally parallel to linear fore-aft movement of the seat slide mechanism 44.

Such a forward and rearward seat position adjustment system 40 is configured with integral seat vibration isolation and is advantageously compact as it is packaged within the length of the slide rails 46 and 48 of the seat slide mechanism 44. The system advantageously adds minimal height to the vertical dimension of the fore-aft seat position adjuster 52. The compact design of the system 40 allows the system 40 to be added to any vehicle seat assembly that uses fore-aft translating seat slide mechanisms of a type similar or substantially the same as the slidably interlocking rail seat slide mechanism 44. The seat position adjuster 52 of the present invention permits some relative linear or fore-aft movement or translation between the rails 46 and 48 of the seat slide mechanism 44 when disposed in the latched position and the isolator 54 activated or not locked with the isolator 54 the seat slide mechanism 44 to constrain travel of the isolator 54 in a linear fore-aft direction generally parallel to relative linear fore-aft movement of the rails 46 and 48 of the seat slide mechanism 44.

The present invention is directed to a position adjustable vehicle seat assembly that includes a seat-carrying housing; at least one seat slide mechanism having one seat slide rail that is movable relative to another seat slide rail enabling movement of the housing in a fore-aft direction; and a fore-aft seat position adjuster comprised of an elongate seat position adjuster control shaft in operable cooperation with a seat position locking latch that latches the seat slide mechanism preventing relative movement between the seat slide rails when the seat position adjuster control shaft disposes the seat position locking latch in a latched position and permits relative movement therebetween when the seat position adjuster control shaft disposes the seat position locking latch in an unlatched position. The seat position adjuster further includes a spring carried by the seat position adjuster control shaft that (i) torsionally biases the seat position locking latch toward the latched position, and (ii) isolates vibration. The seat position adjuster further includes a damper grounded to the housing, the damper having a reciprocable piston rod coupled to the seat position adjuster control shaft for axial movement of the damper piston rod substantially in unison with axial movement of the seat position adjuster control shaft.

The seat position adjuster control shaft is carried by a plurality of spaced apart mounts of the housing and axially movable relative to the housing when the seat position locking latch is disposed in the latched position, wherein the seat position adjuster control shaft has a first load impact absorbing bumper axially fixed thereto that provides a forward stop that is stopped by one of the mounts limiting forward movement of the seat position adjuster control shaft relative to the housing when the seat position locking latch is disposed in the latched position, and wherein one of the seat position adjuster control shaft and the damper piston rod has a second load impact absorbing bumper axially fixed thereto that provides a rearward stop that is stopped by another one of the mounts limiting rearward movement of the seat position adjuster control shaft relative to the housing when the seat position locking latch is disposed in the latched position. There preferably is a vibration isolator lock that grounds the seat position adjuster control shaft to the housing when the seat position locking latch is disposed in the latched position preventing axial movement of the seat position adjuster control shaft relative to the housing when the seat position locking latch is disposed in the latched position.

The seat position locking latch is axially and rotatively fixed to the seat position adjuster control shaft, wherein the seat position adjuster control shaft is supported by a plurality of spaced apart seat position adjuster mounts of the housing enabling axial and rotary movement of the seat position adjuster control shaft relative thereto, and wherein the seat position adjuster further comprises a vibration isolator comprised of a spring coaxially carried by the seat position locking latch, the spring captured in one of tension and compression between the seat position locking latch and one of the plurality of seat position adjuster mounts of the housing. The vibration isolator further includes a damper grounded to the housing having a reciprocable piston rod coupled to the seat position adjuster control shaft. Travel of the vibration isolator is in a fore-aft direction and guided by relative fore-aft movement of one seat slide rail of the seat slide mechanism relative to the other seat slide rail of the seat slide mechanism.

There preferably is a vibration isolator lock that grounds the seat position adjuster control shaft to the housing when the seat position locking latch is disposed in the latched position preventing axial movement of the seat position adjuster control shaft relative to the housing when the seat position locking latch is disposed in the latched position. The vibration isolator lock includes a vibration isolator locking latch rotatively carried by the housing that is rotatable between (a) a locked position where the vibration isolator locking latch is rotated into engagement with the seat position adjuster control shaft grounding the seat position adjuster control shaft to the housing preventing relative axial movement between the seat position adjuster control shaft and the housing, and (b) an unlocked position where the vibration isolator locking latch is rotated away from the locked position disengaging the vibration isolator locking latch from the seat position adjuster control shaft enabling relative axial movement between the seat position adjuster control shaft and the housing to occur.

The seat position adjuster has a vibration isolator in operable cooperation with the seat position adjuster control shaft and the housing, and further comprising a vibration isolator lock that prevents vibration isolator operation by grounding the vibration isolator to the housing when disposed in a locked position, and which allows vibration isolator operation when disposed in an unlocked position away from the locked position un-grounding the vibration isolator from the housing. The seat position adjuster control shaft is manually rotatable by a seat occupant between the latched position where the seat position locking latch latches the seat slide rails preventing relative movement therebetween and an unlatched position disposed from the latched position permitting relative movement between the seat slide rails allowing fore-aft seat position adjustment, and wherein the vibration isolator lock comprises an isolator lockout latch that is manually rotatable by the seat occupant independently of the seat position adjuster control shaft between a locked position where the isolator lockout latch engages with the seat position adjuster control shaft grounding the seat position adjuster control shaft to the housing, and an unlocked position where the isolator lockout latch disengages from the seat position adjuster control shaft un-grounding the seat position adjuster control shaft from the housing. The seat position locking latch is axially and rotatively fixed to the seat position adjuster control shaft, wherein the seat position adjuster control shaft is supported by a plurality of spaced apart seat position adjuster mounts of the housing enabling axial and rotary movement of the seat position adjuster control shaft relative thereto, and wherein the seat position adjuster further comprises a vibration isolator comprised of a spring coaxially carried by the seat position locking latch, the spring captured in one of tension and compression between the seat position locking latch and one of the plurality of seat position adjuster mounts of the housing. The vibration isolator further comprises a damper having a reciprocable piston rod fixed to the seat position adjuster control shaft for axial reciprocable movement in unison therewith. There is vibration isolator lock comprised of a isolator lockout latch disposed alongside the seat position adjuster control shaft, the isolator lockout latch pivotable about an axis of rotation generally parallel to the seat position adjuster control shaft between a locked position where the isolator lockout latch grounds the seat position adjuster control shaft to the housing and an unlocked position where the seat position adjuster control shaft is not grounded to the housing permitting the seat position adjuster control shaft to move axially relative to the housing.

The present invention also is directed to position adjustable vehicle seat assembly that includes: a seat-carrying housing; at least one seat slide mechanism having one seat slide rail that is movable relative to another seat slide rail enabling movement of the housing in a fore-aft direction; a seat position adjuster that includes a fore-aft extending rotary seat position adjuster control shaft, a seat position locking latch carried by the seat position adjuster control shaft that is rotatable between an unlatched position that allows relative movement between the seat slide rails permitting fore-aft seat position to be changed and an latched position where the seat position locking latch engages the seat slide mechanism prevents relative movement between the seat slide rails setting fore-aft seat position, and a spring coaxially carried by the seat position adjuster control shaft that torsionally biases the seat position locking latch toward the latched position, the spring comprising a vibration isolator acting in tension or compression during axial movement of the seat position adjuster control shaft relative to the housing to isolate vibration; and a vibration isolator lock that includes an isolator lockout latch movable between a locked position where the isolator lockout latch grounds the seat position adjuster control shaft to the housing when the isolator lockout latch is disposed in a locked position and where the isolator lockout latch does not ground the seat position adjuster control shaft to the housing when disposed in an unlocked position permitting the seat position adjuster control shaft to move axially relative to the housing. The vibration isolator further includes a damper having a reciprocable piston rod fixed to the seat position adjuster control shaft for axial reciprocable movement in unison therewith. Travel of the vibration isolator, including the seat position adjuster control shaft carrying isolator spring, is in a fore-aft direction and guided by relative fore-aft movement of one seat slide rail of the seat slide mechanism relative to the other seat slide rail of the seat slide mechanism.

Understandably, the present invention has been described above in terms of one or more preferred embodiments and methods. It is recognized that various alternatives and modifications may be made to these embodiments and methods which are within the scope of the present invention. Various alternatives are therefore contemplated as being within the scope of the present invention.

It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention and the appended claims that follow.

What is claimed is:
1. A position adjustable vehicle seat assembly comprising:
   a seat-carrying housing;
   at least one seat slide mechanism having one seat slide rail that is movable relative to another seat slide rail enabling movement of the housing in a fore-aft direction; and
   a fore-aft seat position adjuster comprised of an elongate seat position adjuster control shaft in operable cooperation with a seat position locking latch that latches the seat slide mechanism preventing relative movement between the seat slide rails when the seat position adjuster control shaft disposes the seat position locking latch in a latched position and permits relative movement therebetween when the seat position adjuster control shaft disposes the seat position locking latch in an unlatched position, and
   wherein the seat position adjuster further comprises a vibration isolator that biases the seat position locking latch toward the latched position and is oriented to dampen communication of vibrations between the seat slide rails and the seat carrying housing when the seat position locking latch is oriented in the latched position.

2. The position adjustable vehicle seat assembly of claim 1 wherein the vibration isolator is further defined as a spring carried by the seat position adjuster control shaft that (i) torsionally biases the seat position locking latch toward the latched position, and (ii) isolates vibration.

3. The position adjustable vehicle seat assembly of claim 2 wherein the seat position adjuster further comprises a damper grounded to the housing, the damper having a reciprocable piston rod coupled to the seat position adjuster control shaft for movement of the damper piston rod substantially in unison with movement of the seat position adjuster control shaft and in directions aligned with a longitudinal axis of the seat position adjuster control shaft.

4. The position adjustable vehicle seat assembly of claim 3 wherein the seat position adjuster control shaft is carried by a plurality of spaced apart mounts of the housing and axially movable relative to the housing when the seat position locking latch is disposed in the latched position, wherein the seat position adjuster control shaft has a first load impact absorbing bumper axially fixed thereto that provides a forward stop that is stopped by one of the mounts limiting forward movement of the seat position adjuster control shaft relative to the housing when the seat position locking latch is disposed in the latched position, and wherein one of the seat position adjuster control shaft and the damper piston rod has a second load impact absorbing bumper axially fixed thereto that provides a rearward stop that is stopped by another one of the mounts limiting rearward movement of the seat position adjuster control shaft relative to the housing when the seat position locking latch is disposed in the latched position.

5. The position adjustable vehicle seat assembly of claim 4 further comprising a vibration isolator lock that grounds the seat position adjuster control shaft to the housing when the seat position locking latch is disposed in the latched position preventing axial movement of the seat position adjuster control shaft relative to the housing when the seat position locking latch is disposed in the latched position.

6. The position adjustable vehicle seat assembly of claim 1, wherein the seat position locking latch is axially and rotatively fixed to the seat position adjuster control shaft, wherein the seat position adjuster control shaft is supported by a plurality of spaced apart seat position adjuster mounts of the housing enabling axial and rotary movement of the seat position adjuster control shaft relative thereto, and wherein the vibration isolator is comprised of a spring that is coaxially carried by the seat position locking latch, the spring captured in one of tension and compression between the seat position locking latch and one of the plurality of seat position adjuster mounts of the housing.

7. The position adjustable vehicle seat assembly of claim 6 further comprising a vibration isolator lock that grounds the seat position adjuster control shaft to the housing preventing relative movement therebetween.

8. The position adjustable vehicle seat assembly of claim 7 wherein the vibration isolator lock comprises a vibration isolator locking latch rotatively carried by the housing that is rotatable between (a) a locked position where the vibration isolator locking latch is rotated into engagement with the seat position adjuster control shaft grounding the seat position adjuster control shaft to the housing preventing relative axial movement between the seat position adjuster control shaft and the housing, and (b) an unlocked position where the vibration isolator locking latch is rotated away from the locked position disengaging the vibration isolator locking latch from the seat position adjuster control shaft enabling relative axial movement between the seat position adjuster control shaft and the housing to occur.

9. The position adjustable vehicle seat assembly of claim 6 wherein the vibration isolator further comprises a damper grounded to the housing having a reciprocable piston rod coupled to the seat position adjuster control shaft.

10. The position adjustable vehicle seat assembly of claim 9 further comprising a vibration isolator lock that grounds the seat position adjuster control shaft to the housing preventing relative movement therebetween.

11. The position adjustable vehicle seat assembly of claim 10 wherein the vibration isolator lock comprises a vibration isolator locking latch rotatively carried by the housing that is rotatable between (a) a locked position where the vibration isolator locking latch is rotated into engagement with the seat position adjuster control shaft grounding the seat position adjuster control shaft to the housing preventing relative axial movement between the seat position adjuster control shaft and the housing, and (b) an unlocked position where the vibration isolator locking latch is rotated away from the locked position disengaging the vibration isolator locking latch from the seat position adjuster control shaft enabling relative axial movement between the seat position adjuster control shaft and the housing to occur.

12. The position adjustable vehicle seat assembly of claim 6 wherein travel of the vibration isolator is in a fore-aft direction and guided by relative fore-aft movement of one seat slide rail of the seat slide mechanism relative to the other seat slide rail of the seat slide mechanism.

13. The position adjustable vehicle seat assembly of claim 1 further comprising a vibration isolator lock that prevents vibration isolator operation by grounding the vibration isolator to the housing when disposed in a locked position, and which allows vibration isolator operation when disposed in an unlocked position away from the locked position ungrounding the vibration isolator from the housing.

14. The position adjustable vehicle seat assembly of claim 13 wherein the seat position adjuster control shaft is manually rotatable by a seat occupant between the latched position where the seat position locking latch latches the seat slide rails preventing relative movement therebetween and an unlatched position disposed from the latched position permitting relative movement between the seat slide rails allowing fore-aft seat position adjustment, and wherein the vibration isolator lock comprises an isolator lockout latch that is manually rotatable by the seat occupant independently of the seat position adjuster control shaft between a locked position where the isolator lockout latch engages with the seat position adjuster control shaft grounding the seat position adjuster control shaft to the housing, and an unlocked position where the isolator lockout latch disengages from the seat position adjuster control shaft ungrounding the seat position adjuster control shaft from the housing.

15. The position adjustable vehicle seat assembly of claim 14 wherein the seat position locking latch is axially and rotatively fixed to the seat position adjuster control shaft, wherein the seat position adjuster control shaft is supported by a plurality of spaced apart seat position adjuster mounts of the housing enabling axial and rotary movement of the seat position adjuster control shaft relative thereto, and wherein the seat position adjuster further comprises a vibration isolator comprised of a spring coaxially carried by the seat position locking latch, the spring captured in one of tension and compression between the seat position locking latch and one of the plurality of seat position adjuster mounts of the housing.

16. The position adjustable vehicle seat assembly of claim 15 further comprising a vibration isolator lock comprised of an isolator lockout latch disposed alongside the seat position adjuster control shaft, the isolator lockout latch pivotable about an axis of rotation generally parallel to the seat position adjuster control shaft between a locked position where the isolator lockout latch grounds the seat position adjuster control shaft to the housing and an unlocked position where the seat position adjuster control shaft is not grounded to the housing permitting the seat position adjuster control shaft to move axially relative to the housing.

17. The position adjustable vehicle seat assembly of claim 16 wherein the vibration isolator further comprises a damper having a reciprocable piston rod fixed to the seat position adjuster control shaft for axial reciprocable movement in unison therewith.

18. A position adjustable vehicle seat assembly comprising:
- a seat-carrying housing;
- at least one seat slide mechanism having one seat slide rail that is movable relative to another seat slide rail enabling movement of the housing in a fore-aft direction;
- a seat position adjuster comprised of a fore-aft extending rotary seat position adjuster control shaft, a seat position locking latch carried by the seat position adjuster control shaft that is rotatable between an unlatched position that allows relative movement between the seat slide rails permitting fore-aft seat position to be changed and a latched position where the seat position locking latch engages the seat slide mechanism prevents relative movement between the seat slide rails setting fore-aft seat position, and a spring coaxially carried by the seat position adjuster control shaft that torsionally biases the seat position locking latch toward the latched position, the spring comprising a vibration isolator acting in tension or compression during axial movement of the seat position adjuster control shaft relative to the housing to isolate vibration; and
- a vibration isolator lock comprised of an isolator lockout latch movable between a locked position where the isolator lockout latch grounds the seat position adjuster control shaft to the housing when the isolator lockout latch is disposed in a locked position and where the isolator lockout latch does not ground the seat position adjuster control shaft to the housing when disposed in an unlocked position permitting the seat position adjuster control shaft to move axially relative to the housing,
wherein the vibration isolator further comprises a damper having a reciprocable piston rod axially anchored to the seat position adjuster control shaft for axial reciprocable movement in unison therewith.

19. The position adjustable vehicle seat assembly of claim 6 wherein travel of the vibration isolator is in a fore-aft direction and guided by relative fore-aft movement of one seat slide rail of the seat slide mechanism relative to the other seat slide rail of the seat slide mechanism.

* * * * *